US005586000A

United States Patent [19]
Sakata et al.

[11] Patent Number: 5,586,000
[45] Date of Patent: Dec. 17, 1996

[54] SOLID ELECTROLYTIC CAPACITOR AND PROCESS FOR PRODUCTION THEREOF

[75] Inventors: Koji Sakata, Toyama; Maki Minamoto, Shiga; Takashi Fukaumi; Toshihiko Nishiyama, both of Tokyo; Satoshi Arai, Toyama; Hiromichi Taniguchi, Tokyo, all of Japan

[73] Assignee: NEC Corporation, Tokyo, Japan

[21] Appl. No.: 360,582

[22] Filed: Dec. 21, 1994

[30] Foreign Application Priority Data

Dec. 28, 1993 [JP] Japan .................................. 5-337940
Sep. 22, 1994 [JP] Japan .................................. 6-227725

[51] Int. Cl.$^6$ .................. H01G 9/00; H01G 9/07
[52] U.S. Cl. .................. 361/525; 361/502; 361/504; 361/523; 361/526; 361/528; 361/516; 29/25.03
[58] Field of Search .................. 361/525, 523, 361/526, 534, 522, 528, 526, 503, 504; 29/25.03

[56] References Cited

FOREIGN PATENT DOCUMENTS

| 0285728 | 10/1988 | European Pat. Off. ............... 361/523 |
| 52-79255 | 7/1977 | Japan . |
| 63-181309 | 7/1988 | Japan . |
| 1-121918 | 8/1989 | Japan . |
| 3-127813 | 5/1991 | Japan . |
| 3-109714 | 5/1991 | Japan . |
| 3-109713 | 5/1991 | Japan . |
| 3-109712 | 5/1991 | Japan . |
| 3-163814 | 7/1991 | Japan . |

OTHER PUBLICATIONS

Patent Abstracts of Japan, vol. 13, No. 393 (E–814), 31 Aug. 1989 & JP–A–01 140621 (Nitsuko Corp), 1 Jun. 1989.
Patent Abstracts of Japan, vol. 15, No. 304 (E–1096), 5 Aug. 1991 & JP–A–03 109714 (Kao Corp), 9 May 1991.
Patent Abstracts of Japan, vol. 15, No. 304 (E–1096), 5 Aug. 1991 & JP–A–03 109712 (Kao Corp), 9 May 1991.
Patent Abstracts of Japan, vol. 13, No. 278 (C–611), 26 Jun. 1989 & JP–A–01 075518 (Japan Carlit Co Ltd), 22 Mar. 1989.

*Primary Examiner*—Leo P. Picard
*Assistant Examiner*—Anthony Dinkins
*Attorney, Agent, or Firm*—Burns, Doane, Swecker & Mathis, LLP

[57] ABSTRACT

The present invention provides a solid electrolytic capacitor comprising a metal having a dielectric oxide film formed thereon, a conductive polymer compound layer formed on said dielectric oxide film, a conductive paste layer formed on said conductive polymer compound layer, a molded resin sheathing having all of the above members buried therein, and a pair of electrodes connected to said metal and said conductive paste layer, respectively, in which capacitor an antioxidant is scattered, in the form of particles, in at least one of said conductive polymer compound layer, said conductive paste layer and the interface between the conductive polymer compound layer and the conductive paste layer; and a process for production of said capacitor.

7 Claims, 3 Drawing Sheets

SOLID ELECTROLYTIC CAPACITOR AND PROCESS FOR PRODUCTION THEREOF

BACKGROUND OF THE INVENTION

1. Field of the Invention

The present invention relates to a solid electrolytic capacitor and a process for production thereof. More particularly, the present invention relates to a solid electrolytic capacitor which is substantially free from the reduction in conductivity caused by the oxidative deterioration of the conductive polymer compound used therein as a solid electrolyte, as well as to a process for production of said capacitor.

2. Description of the Related Art

There have hitherto been reported solid electrolytic capacitors as shown in FIG. 1, which comprise an anode metal 1 made of, for example, tantalum or aluminum, a dielectric oxide film 2 formed on the metal 1 by subjecting the surface of the metal 1 to anodic oxidation, a solid electrolyte layer 9 made of, for example, a metal oxide (e.g. manganese dioxide or lead dioxide) [Japanese Patent Application Kokai (Laid-Open) No. 163814/1991] or 7,7',8,8'-tetracyanoquinodimethane complex (hereinafter referred to as TCNQ complex) [Japanese Patent Application Kokai (Laid-Open) No. 79255/1977], formed on the dielectric oxide film 2, a conductive paste layer 4 made of, for example, a graphite paste or a silver paste, formed on the solid electrolyte layer 9, and a molded resin sheathing 8 (made of an epoxy resin) having all of the above members buried therein. In FIG. 1, 5a and 5b are external electrodes connected to the conductive paste layer 4 and the metal 1, respectively.

Such a solid electrolytic capacitor using manganese dioxide as the solid electrolyte layer has no sufficient conductivity and therefore shows a large impedance at a high-frequency region. A solid electrolytic capacitor using TCNQ complex as the solid electrolyte layer is interior in heat resistance because the TCNQ complex is heat-decomposed easily.

Meanwhile in recent years, as electronic apparatuses have become smaller, more speedy in response and more digitized, capacitors of good properties have come to be required.

For such a requirement, there were proposed solid electrolytic capacitors using, as the solid electrolyte layer, an aromatic conductive polymer compound (e.g. a polypyrrole) having a higher conductivity than conventional solid electrolytes (e.g. manganese dioxide, lead dioxide and TCNQ complex) and a molded resin sheathing made of an epoxy resin, a silicon resin or the like.

In these solid electrolytic capacitors using a conductive polymer compound (this undergoes oxidation easily) as the solid electrolyte, however, the oxygen in the air diffuses through the resin sheathing and penetrates deep into the capacitor in a high-temperature atmosphere, and oxidizes the conductive polymer compound. This results in lower conductivity of the conductive polymer compound and consequent increase in the high-frequency ESR (equivalent series resistance). In order to solve this problem, there were proposed, as shown in FIG. 2, a capacitor comprising an oxygen barrier layer 10 made of a resin, formed on a conductive paste layer 4 [Japanese Patent Application Kokai (Laid-Open) No. 109714/1991] and a capacitor comprising an oxygen barrier layer 10 made of a metal (e.g. solder) [Japanese Patent Application Kokai (Laid-Open) No. 109712/1991].

Also in Japanese Patent Application Kokai (Laid-Open) No. 127813/1991 and Japanese Patent Application Kokai (Laid-Open) No. 181309/1988, there were proposed processes for producing a solid electrolytic capacitor, wherein the heat treatment conducted in the steps from the formation of a conductive polymer compound layer to before the sealing with a sheathing or in the steps from after the formation of a conductive polymer layer to the sealing with a resin sheathing is conducted in an inert gas. There was also proposed, as shown in FIG. 3, a process which comprises surrounding a capacitor element 11 with an insulating frame 12 to form a gap of desired dimension between the surface of the capacitor element 11 and the insulating frame 12, filling the gap with an oxygen-free compound or a resin or fatty oil agent 13 generating no active oxygen, and then conducting sheathing [Japanese Utility Model Application Kokai (Laid-Open) No. 121918/1989].

In the processes disclosed in Japanese Patent Application Kokai (Laid-Open) No. 109714/1991 and Japanese Patent Application Kokai (Laid-Open) No. 109712/1991, however, an oxygen barrier layer (a resin layer or a metal layer) is formed in order to prevent the reduction in conductivity caused by the oxidation of conductive polymer compound layer by the oxygen in penetrating air which and this invites an increase in step. In the process disclosed in Japanese Patent Application Kokai (Laid-Open) No. 109712/1991, heating (e.g. 200°–300° C. in the case of solder) is conducted during the formation of metal layer or conductive polymer compound layer; this heating gives rise to dedoping phenomenon of conductive polymer compound layer, inviting reduction in conductivity of conductive polymer compound layer and increase in high-frequency ESR. The operation for capacitor production in an inert gas atmosphere, as disclosed in Japanese Patent Application Kokai (Laid-Open) No. 127813/1991 or Japanese Patent Application Kokai (Laid-Open) No. 181309/1988 must be conducted in a closed system, is inefficient, and is unsuited for mass production. The process disclosed in Japanese Utility Model Application Kokai (Laid-Open) No. 121918/1989 has drawbacks in that the firm surrounding of capacitor element with insulating frame requires a technique and the use of insulating frame incurs an increase in cost.

SUMMARY OF THE INVENTION

The object of the present invention is to produce, in an easy operation and at a low cost, a solid electrolytic capacitor which is substantially free from the reduction in conductivity caused by the oxidation of the conductive polymer compound layer by the oxygen in penetrating air and which causes no increase in ESR.

In order to solve the above-mentioned problems of the prior art, the present inventors already proposed a solid electrolytic capacitor comprising a metal, a dielectric oxide film (an oxide of said metal) formed thereon, a conductive polymer compound layer formed on the dielectric oxide film, a conductive paste layer formed on the conductive polymer compound layer, and a molded resin sheathing having all of the above members buried therein, in which capacitor the resin sheathing contains an oxygen-adsorbing substance capable of adsorbing oxygen selectively [Japanese Patent Application No. 164/1993].

The present inventors made further study and found out a new solid electrolytic capacitor free from the above problems and a process for production thereof. The finding has led to the completion of the present invention.

The first aspect of the present invention is a solid electrolytic capacitor comprising a metal having a dielectric oxide film formed thereon, a conductive polymer compound layer formed on said dielectric oxide film, a conductive paste layer formed on said conductive polymer compound layer, a molded resin sheathing having all of the above members buried therein, and a pair of electrodes connected to said metal and said conductive paste layer, respectively, in which capacitor an antioxidant is scattered, in the form of particles, on the outer surface of said conductive paste layer.

The second aspect of the present invention is a solid electrolytic capacitor comprising a metal having a dielectric oxide film formed thereon, a conductive polymer compound layer formed on said dielectric oxide film, a conductive paste layer formed on said conductive polymer compound layer, a molded resin sheathing having all of the above members buried therein, and a pair of electrodes connected to said metal and said conductive paste layer, respectively, in which capacitor an antioxidant is scattered, in the form of particles, in at least one of said conductive polymer compound layer, said conductive paste layer and the interface between the conductive polymer compound layer and the conductive paste layer.

The present invention further provides:

a process for producing the solid electrolytic capacitor set forth in the above first aspect, which comprises:

a step of forming, on a metal, a dielectric oxide film which is an oxide of said metal, a step of forming a conductive polymer compound layer on said dielectric oxide film, a step of forming a conductive paste layer on said conductive polymer compound layer, a step of connecting a pair of external electrodes to said metal and said conductive paste layer, respectively, and a step of scattering an antioxidant in the form of particles on said conductive paste layer; and a process for producing the solid electrolytic capacitor set forth in the above second aspect, which comprises:

a step of forming, on a metal, a dielectric oxide film which is an oxide of said metal, a step of forming a conductive polymer compound layer on said dielectric oxide film, a step of forming a conductive paste layer on said conductive polymer compound layer, and a step of scattering an antioxidant in the form of particles in at least one of said conductive polymer compound layer, said conductive paste layer and the interface between the conductive polymer compound layer and the conductive paste layer.

DETAILED DECRYPTION OF THE INVENTION

Figure 1:
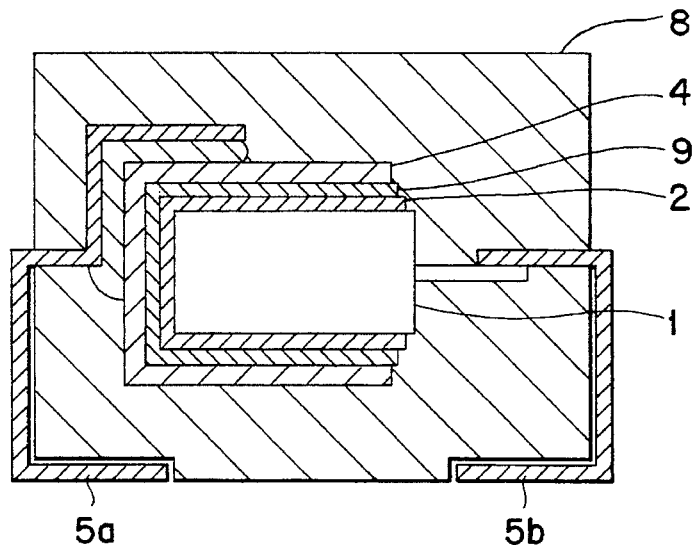
FIG. 1 is a sectional view showing an example of the constitutions of conventional solid electrolytic capacitors.
Figure 2:
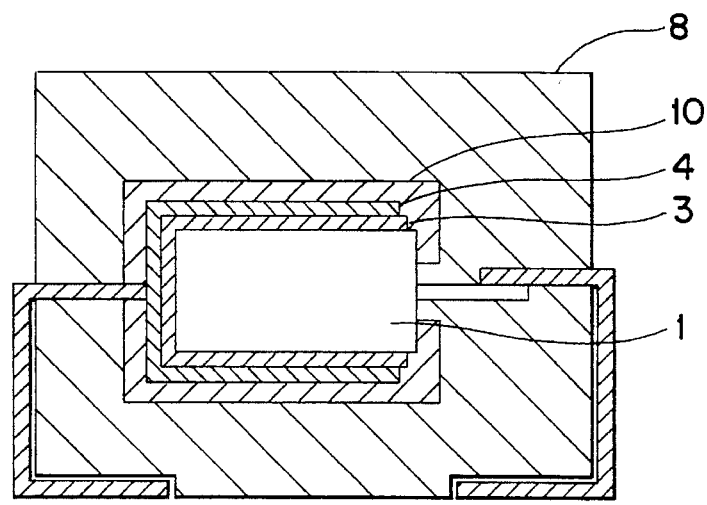
FIG. 2 is a sectional view showing other example of the constitutions of conventional solid electrolytic capacitors.
Figure 3:
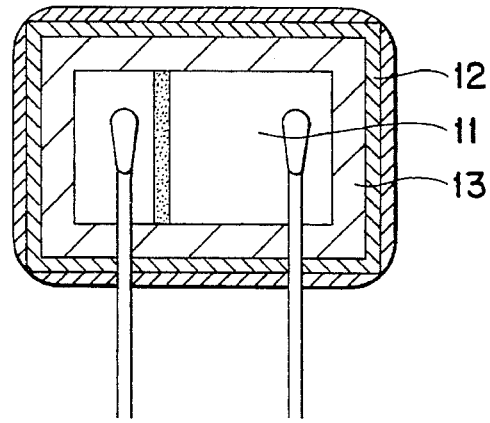
FIG. 3 is a sectional view showing still other example of the constitutions of conventional solid electrolytic capacitors.

The basic constitution of the solid electrolytic capacitor of the present invention is nearly the same as those of conventional solid electrolytic capacitors except for the way of using an antioxidant. That is, the shape, material, etc. of the present capacitor can be basically the same as those known conventionally and have no particular restriction.

In the present capacitor, the metal constituting the anode is a metal capable of forming a dielectric oxide film on the surface. Such a metal includes tantalum, aluminum, etc. which are all known per se.

The metal is preferably obtained by converting fine metal particles into a sintered material or a film and then subjecting the sintered material or the film to an etching treatment to make the surface larger.

The antioxidant is preferably one compound or at least two compounds (in this case, a mixed antioxidant is used) selected from the group consisting of phenol type compounds (e.g. hydroquinone, p-nitrophenol, 2,6-di-tert-butyl-4-methylphenol and tert-butyl-4-methoxyphenol), benzophenone type compounds (e.g. 2-hydroxy-4-methoxybenzophenone and 2-hydroxy-4-octoxybenzophenone), salicylic acid type compounds (e.g. phenyl salicylate, monoglycol salicylate and p-tertbutylphenyl salicylate) and benzotriazole type compounds [e.g. 2(2'-hydroxy-5'-methylphenyl)benzotriazole and 2(2'-hydroxy-3', 5'-di-tert-butylphenyl)benzotriazole].

The antioxidant is scattered in the conductive paste layer, the conductive polymer compound layer or the interface between the two layers, or on the outer surface of the conductive paste layer. Herein, "scattered" refers to a state in which the antioxidant is scattered in the form of independent fine particles, and excludes a state in which the antioxidant is present in the form of a continuous film.

The shape of the antioxidant particles has no particular restriction and includes, for example, a spherical shape and a flat shape.

The diameter of the antioxidant particles is preferably 0.01–1.0 μm, particularly preferably 0.05–0.5 μm.

The amount of the antioxidant used is 1–100 g, particularly preferably 10–50 g per liter (unit total volume) of the conductive polymer compound layer and the conductive paste layer.

Next, description is made on the process for production of the present solid electrolytic capacitor.

Capacitor of First Aspect

The solid electrolytic capacitor of the first aspect is a solid electrolytic capacitor in which the antioxidant is scattered on the conductive paste layer.

A typical example of the process for production of this solid electrolytic capacitor is as follows. A metal is oxidized to form an oxide film thereon; on the oxide film is formed a conductive polymer compound layer; on the conductive polymer compound layer is formed a conductive paste layer; external electrodes are fixed to prepare a capacitor element; the capacitor element is immersed in a solution in which an antioxidant is dissolved, and then dried to remove the vaporizing component (solvent), whereby the antioxidant is scattered on the conductive paste layer; thereafter, the outside of the resulting material is coated with a resin to form a molded resin sheathing, whereby a solid electrolytic capacitor is completed.

Capacitor of Second Aspect

The solid electrolytic capacitor of the second aspect is a solid electrolytic capacitor in which the antioxidant is scattered in at least one of the conductive polymer compound layer, the conductive paste layer and the interface between the two layers.

As the process for production of the solid electrolytic capacitor of the second aspect, there can be cited, for example, the following two processes, depending upon the way in which the antioxidant is scattered.

In the first process, a material containing an antioxidant is used. For example, when an antioxidant is scattered in a conductive paste layer, there is used a conductive paste containing an antioxidant. That is, a metal is oxidized to form an oxide film thereon; on the oxide film is formed a conductive polymer compound layer; on the conductive polymer compound layer is formed a conductive paste layer using said conductive paste containing an antioxidant; then, external electrodes are fixed; the outside of the resulting material is coated with a resin to form a molded resin sheathing, whereby a solid electrolytic capacitor is completed.

In another example of the first process, a metal is oxidized to form an oxide film thereon, and on the oxide film is formed a conductive polymer compound layer. In the step of forming the conductive polymer compound layer, said layer is formed by oxidative polymerization using a solution containing an antioxidant. That is, when electrolytic polymerization is conducted, it is conducted with an antioxidant dissolved in an electrolytic solution; and when chemical polymerization is conducted, it is conducted using a solution containing a monomer, an oxidizing agent and an antioxidant. Thereafter, a conductive paste layer is formed; external electrodes are withdrawn; and the outside of the resulting material is coated with a resin to form a molded resin sheathing, whereby a solid electrolytic capacitor is completed.

Incidentally, the electrolytic polymerization or chemical polymerization can be conducted under the same conditions as known per se to those skilled in the art.

In the second process, a capacitor element is immersed in a solution containing an antioxidant, whereby a solid electrolytic capacitor is produced. In this case, after the capacitor element has been immersed in the solution containing an antioxidant, a drying step may be adopted in order to remove the vaporizing component (solvent).

Description is made, for example, on a case in which an antioxidant is scattered in the conductive polymer compound layer. That is, a metal is oxidized to form an oxide film thereon, and on the oxide film is formed a conductive polymer compound layer. In the step of forming the conductive polymer compound layer, a conductive polymer compound is formed by oxidative polymerization and then is immersed in a solution containing an antioxidant. Then, drying is conducted to remove the vaporizing component (solvent). A series of these operations, i.e. the formation of a conductive polymer compound and the scattering of an antioxidant therein are repeated until a layer of desired thickness is obtained, whereby a conductive polymer compound layer is formed. Thereafter, a conductive paste layer is formed on the conductive polymer compound layer; external electrodes are withdrawn; and the outside of the resulting material is coated with a resin to form a molded resin sheathing, whereby a solid electrolytic capacitor is completed.

The concentration of the antioxidant in the antioxidant solution in which the conductive polymer compound is immersed, is preferably 1–100 g/liter, more preferably 10–50 g/liter. The time of the immersion is preferably 30 seconds to 10 minutes, more preferably 60–300 seconds,. The temperature at which the immersion is made, is preferably 10°–65° C.

When an antioxidant is scattered in the interface between the conductive polymer compound layer and the conductive paste layer, a metal is oxidized to form an oxide film thereon, and on the oxide film is formed a conductive polymer compound layer. Then, the resulting material is immersed in a solution containing an antioxidant, followed by drying to remove the vaporizing component (solvent), whereby the antioxidant is scattered on the upper surface of the conductive polymer compound layer. Thereafter, a conductive paste layer is formed, whereby the antioxidant can be scattered in the interface between the conductive polymer compound layer and the conductive paste layer. The outside of the resulting material is coated with a resin to form a molded resin sheathing, whereby a solid electrolytic capacitor is completed.

The novelty of the present invention lies in that while in the above-mentioned conventional solid electrolytic capacitors, there is present a continuous resin layer (film) as an oxygen barrier layer in the circumference of the capacitor element, there is scattered, in the present solid electrolytic capacitor, an antioxidant in the circumference of the capacitor element.

Further, the solid electrolytic capacitor of the second aspect of the present invention is effective because the antioxidant is scattered in the form of particles. That is, the antioxidant scattered in the conductive polymer compound layer, the conductive paste layer or the interface between the two layers is not a continuous phase and can therefore prevent the oxidation of the conductive polymer compound with the conductivity of the polymer compound being maintained. In contrast, when there is used a continuous resin layer (film) as oxygen barrier layer as in the conventional solid electrolytic capacitors, the conductivity is reduced by the continuous resin film. Hence, such a continuous resin film cannot be used in the present invention. When an antioxidant is scattered in the form of particles, the oxidation of the conductive polymer compound can be prevented and the conductivity of said polymer compound can be maintained by controlling their diameters or their amount.

The solid electrolytic capacitor of the present invention, having at least one oxygen-adsorbing compound or antioxidant scattered therein, can prevent the reduction in conductivity caused by the oxidative deterioration of the conductive polymer compound and has excellent high-temperature durability.

EXAMPLES

Example 1

Figure 4A:
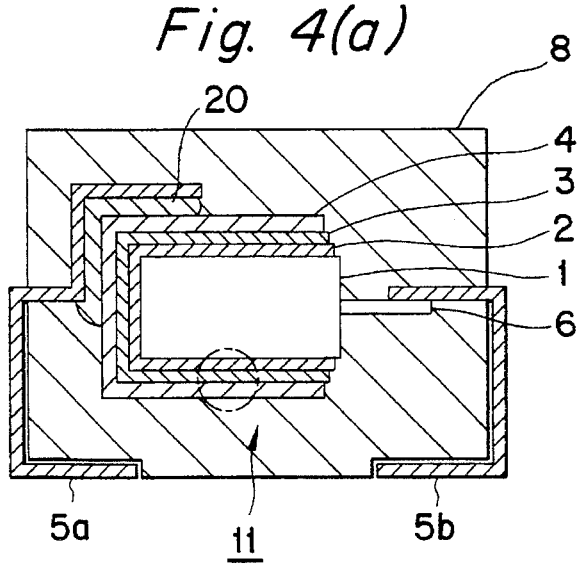
FIG. 4 shows an example of the solid electrolytic capacitor of the present invention, wherein (a) is a sectional view and (b) is a partially enlarged view.
Figure 4B:
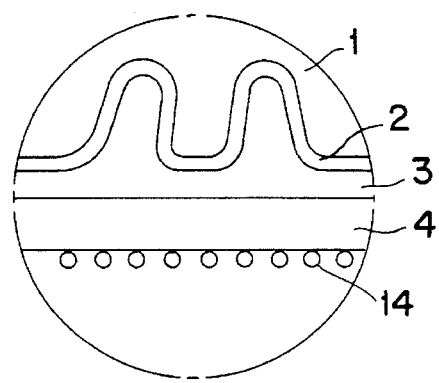

FIG. 4 is a sectional view showing an example of the constitution of the solid electrolytic capacitor according to the first aspect of the present invention.

A metal 1 consisting of a sintered tantalum material of rectangular parallelepiped form [3.5 mm×3.0 mm×1.5 mm (thickness)] was subjected to anodic oxidation in an aqueous phosphoric acid solution at 90 V for 60 minutes. The resulting material was washed and dried to obtain a pellet having a porous surface coated with an oxide film 2. The pellet had an electrostatic capacity of 15 µF as measured in an aqueous phosphoric acid solution.

The pellet coated with an oxide film 2 was immersed in a methanol solution containing 20% by weight of ferric dodecylbenzenesulfonate (oxidizing agent), dried all 60° C. for 30 minutes, immersed in an aqueous solution containing 1 mole % of pyrrole for 10 minutes, and kept therein at room temperature for 30 minutes to polymerize pyrrole. A series of this operation (charging with oxidizing agent, contact with pyrrole and polymerization of pyrrole) was repeated five times to form a conductive polymer compound layer 3 consisting of a conductive polypyrrole layer having a thickness ranging from 5 to 10 µm. Then, washing with ethanol and drying were conducted, after which a conductive paste layer 4 of 10–50 µm in thickness was formed on the surface of the conductive polypyrrole layer.

The formation of the conductive paste layer 4 was conducted by coating a silver paste on the conductive polypyrrole layer, followed by heat-curing.

Thereafter, the conductive paste layer 4 (the cathode side of capacitor element 11) was connected to an external electrode 5a with a silver paste. Incidentally, 20 is an adhesive layer consisting of the silver paste.

At the anode side of capacitor element 11, the tantalum wire 6 (which had been withdrawn beforehand from the sintered tantalum material) was welded to an external electrode 5b. Thus, the capacitor element 11 was connected to the external electrodes. Then, there was conducted the subject of the present invention, i.e. an operation of scattering an antioxidant in the form of particles. That is, the capacitor element 11 provided with external electrodes was immersed in an aqueous solution containing 10 g/liter of 3,3'-thiodipropionic acid (antioxidant) for 10 minutes, and then dried at 125° C. for 30 minutes. Thereby, the antioxidant 14 [shown in FIG. 4(b)] was scattered, in the form of particles, on the upper surface of the conductive paste layer 4 (i.e. the surface of the conductive paste layer 4 to contact with a molded resin sheathing). The outside of the resulting material was coated with an epoxy resin to form a molded resin sheathing 8, whereby a solid electrolytic capacitor was completed.

As shown in Table 1, the solid electrolytic capacitor had an electrostatic capacity of 15 µF at 120 Hz, a tan δ of 1.9% and an ESR of 78 mΩ at 100 KHz. After having been allowed to stand at a high temperature (105° C.) for 500 hours, the capacitor had an electrostatic capacity of 14.9 µF at 120 Hz, a tan δ of 2.1% and an ESR of 83 mΩ at 100 KHz and showed excellent high-temperature durability.

Example 2

Figure 5A:
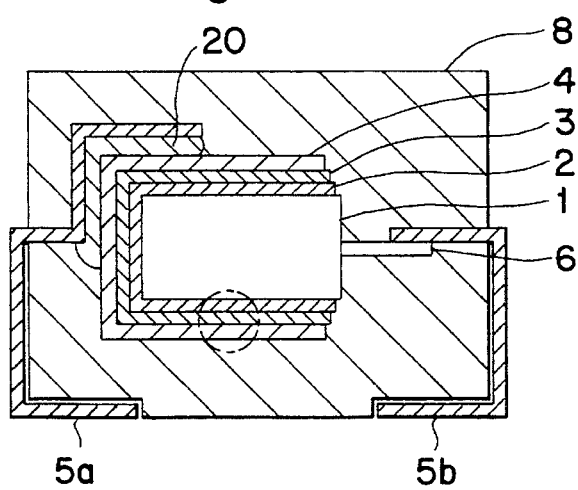
FIG. 5 shows other example of the solid electrolytic capacitor of the present invention, wherein (a) is a sectional view and (b) is a partially enlarged view.

FIG. 5 is a sectional view showing an example of the constitution of the solid electrolytic capacitor according to the second aspect of the present invention.

By using the same sintered tantalum material and the same procedure as in Example 1, there was formed, on the sintered tantalum material, an oxide film 2 and a conductive polymer compound layer 3 consisting of a polypyrrole.

Figure 5B:
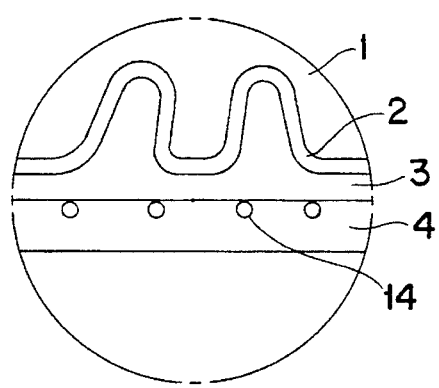

Then, washing with ethanol and drying were conducted. Thereafter, there was conducted the subject of the present invention, i.e. an operation of scattering an antioxidant in the interface between the above-formed conductive polypyrrole layer and a conductive paste layer 4. That is, the material after ethanol washing and drying was immersed for 10 minutes in an aqueous solution containing 10 g/liter of 3,3'-thiodipropionic acid (antioxidant), and then dried at 125° C. for 30 minutes. By this operation, an antioxidant 14 in the form of particles of 0.1 µm in average diameter as shown in FIG. 5(b) was scattered on the surface of the conductive polypyrrole layer.

Next, a conductive paste layer 4 was formed on the conductive polypyrrole layer on which the antioxidant was scattered, in the same procedure as in Example 1. Then, the cathode side of the resulting capacitor element was connected to an external electrode 5a using a silver paste. The anode side of the capacitor element was connected to an external electrode 5b by welding the tantalum wire 6 withdrawn beforehand from the sintered tantalum material, to the external electrode 5b. Thereafter, the outside of the resulting material was coated with a resin to form a molded resin sheathing, whereby a solid electrolytic capacitor was completed.

The resin used for formation of the molded resin sheathing was an epoxy resin. The thickness of the sheathing varied depending upon the site but was 100–200 µm.

As shown in Table 1, the solid electrolytic capacitor had an electrostatic capacity of 15 µF at 120 Hz, a tan δ of 1.9% and an ESR of 79 mΩ at 100 KHz. After having been allowed to stand at a high temperature (105° C.) for 500 hours, the capacitor had an electrostatic capacity of 14.9 µF at 120 Hz, a tan δ of 2.1% and an ESR of 85 mΩ at 100 KHz and showed excellent high-temperature durability.

Example 3

Figure 6A:
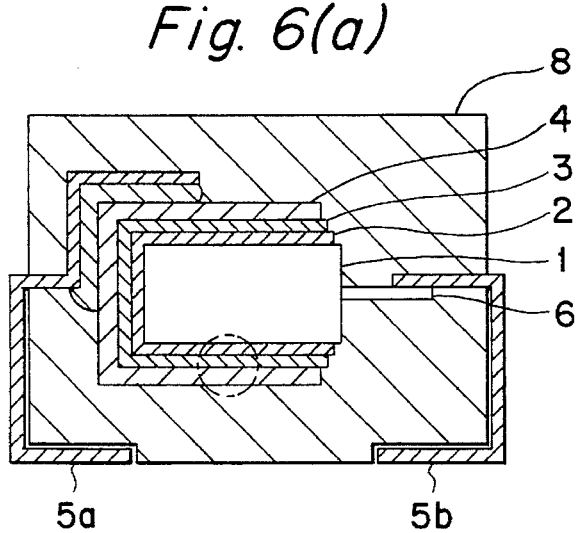
FIG. 6 shows still other example of the solid electrolytic capacitor of the present invention, wherein (a) is a sectional view and (b) is a partially enlarged view.

FIG. 6 is a sectional view showing other example of the constitution of the solid electrolytic capacitor according to the second aspect of the present invention.

By using the same sintered tantalum material and the same procedure as in Example 1, there was formed an oxide film 2 on the sintered tantalum material.

Then, there was conducted the subject of the present invention, i.e. an operation of forming, on the oxide film 2, a conductive polymer compound layer 3 consisting of a conductive polypyrrole, in which an antioxidant was scattered. That is, in the same manner as in Example 1, the pellet covered with the oxide film 2 was immersed for 10 minutes in a methanol solution containing 20% by weight of ferric dodecylbenzenesulfonate and then dried at 60° C. for 30 minutes, whereby the pellet was charged with the oxidizing agent.

The resulting material was immersed in an aqueous solution containing 1 mole % of pyrrole for 10 minutes and kept therein at room temperature for 30 minutes to polymerize pyrrole, whereby a conductive polypyrrole layer was formed.

The conductive polypyrrole layer was immersed for 10 minutes in an aqueous solution containing 10 g/liter of 3,3'-thiodipropionic acid (antioxidant) and then dried at 125° C. for 30 minutes.

Figure 6B:
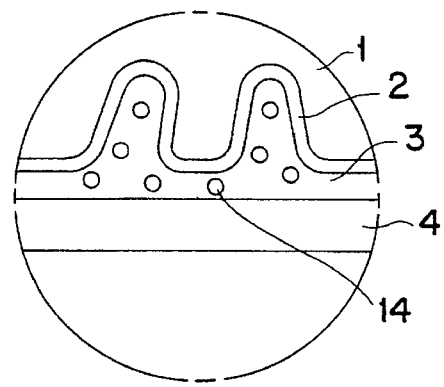

A series of these operations (charging with oxidizing agent, contact with monomer, polymerization of monomer and scattering of antioxidant) were repeated five times, whereby was formed, as shown in FIG. 6(b), a conductive polymer compound layer 3 of 5–10 µm in thickness in which an antioxidant 14 was scattered.

The average particle diameter of the antioxidant scattered in the conductive polypyrrole layer was 0.1 μm. The proportion of the antioxidant to the total volume of the conductive polymer compound layer and the conductive paste layer was 10 g/liter.

Next, a conductive paste layer 4 was formed on the conductive polypyrrole layer in which the antioxidant was scattered. The conductive paste used was a silver paste.

The cathode side of the resulting capacitor element was connected to an external electrode 5a using a silver paste. The anode side of the capacitor element was connected to an external electrode 5b by welding the tantalum wire 6 withdrawn beforehand from the sintered tantalum material, to the external electrode 5b. Thereafter, the outside of the resulting material was coated with a resin to form a molded resin sheathing, whereby a solid electrolytic capacitor was completed.

The resin used for formation of the molded resin sheathing was an epoxy resin. The thickness of the sheathing varied depending upon the site but was 100–200 μm.

As shown in Table 1, the solid electrolytic capacitor had an electrostatic capacity of 15 μF at 120 Hz, a tan δ of 1.9% and an ESR of 79 mΩ at 100 KHz. After having been allowed to stand at a high temperature (105° C.) for 500 hours, the capacitor had an electrostatic capacity of 14.9 μF at 120 Hz, a tan δ of 2.0% and an ESR of 82 mΩ at 100 KHz and showed excellent high-temperature durability.

Example 4

In this Example, an oxide film 2 was formed on the same pellet as used in Example 1, in the same procedure as in Example 1.

Then, there was formed a conductive polypyrrole in which an antioxidant was scattered. That is, the pellet coated with the oxide film 2 was immersed for 10 minutes in a methanol solution containing 20% by weight of ferric dodecylbenzenesulfonate (oxidizing agent), and then dried at 60° for 30 minutes.

The resulting material was immersed for 10 minutes in an aqueous solution containing 10 g/liter of an antioxidant (3,3'-thiodipropionic acid) and 5% by weight of pyrrole and then kept therein at room temperature for 30 minutes to polymerize pyrrole.

A series of these operations (charging with antioxidant, contact with monomer and polymerization of monomer) were repeated five times, whereby a conductive polypyrrole layer 3 was formed. Subsequently, washing with ethanol and drying were conducted, after which a conductive paste layer 4 was formed on the conductive polypyrrole layer 3 in the same manner as in Example 1.

The cathode side of the resulting capacitor element was connected to an external electrode 5a using a silver paste. The anode side of the capacitor element was connected to an external electrode 5b by welding the tantalum wire 6 withdrawn beforehand from the sintered tantalum material, to the external electrode 5b. Thereafter, the outside of the resulting material was coated with a resin to form a molded resin sheathing, whereby a solid electrolytic capacitor was completed.

The resin used for formation of the molded resin sheathing was an epoxy resin. The thickness of the sheathing varied depending upon the site but was 100–200 μm.

As shown in Table 1, the solid electrolytic capacitor had an electrostatic capacity of 15 μF at 120 Hz, a tan δ of 1.9% and an ESR of 79 mΩ at 100 KHz. After having been allowed to stand at a high temperature (105° C.) for 500 hours, the capacitor had an electrostatic capacity of 14.9 μF at 120 Hz, a tan δ of 2.0% and an ESR of 81 mΩ at 100 KHz and showed excellent high-temperature durability.

Example 5

The operation up to the formation of a conductive polypyrrole layer was conducted in the same manner as in Example 4. Then, washing with methanol and drying were conducted.

Thereafter, a methanol solution containing 5 g/liter of p-nitrophenol and 5 g/liter of 3,3'-thiodipropionic acid was allowed to infiltrate into the conductive polypyrrole layer, followed by drying, whereby the two antioxidants were introduced into the conductive polypyrrole layer. The connection to external electrodes and the formation of molded resin sheathing were conducted in the same manner as in Example 4, whereby a solid electrolytic capacitor was completed.

Comparative Example 1

A solid electrolytic capacitor was produced under the same conditions as in Example 1 except that manganese dioxide was used as the solid electrolyte and no antioxidant was used.

Comparative Example 2

A solid electrolytic capacitor was produced under the same conditions as in Example 1 except that 7,7',8,8'-tetracyanoquinodimethane complex (TCNQ) was used as the solid electrolyte and no antioxidant was used.

The capacitors of Examples 1–5 and Comparative Examples 1–2 were subjected to a 1,000-hour high-temperature storage test in order to examine their heat resistances. The results are shown in Table 1. The capacitors of Examples 1–5 are superior to those of Comparative Examples 1–2.

Example 6

Figure 7A:
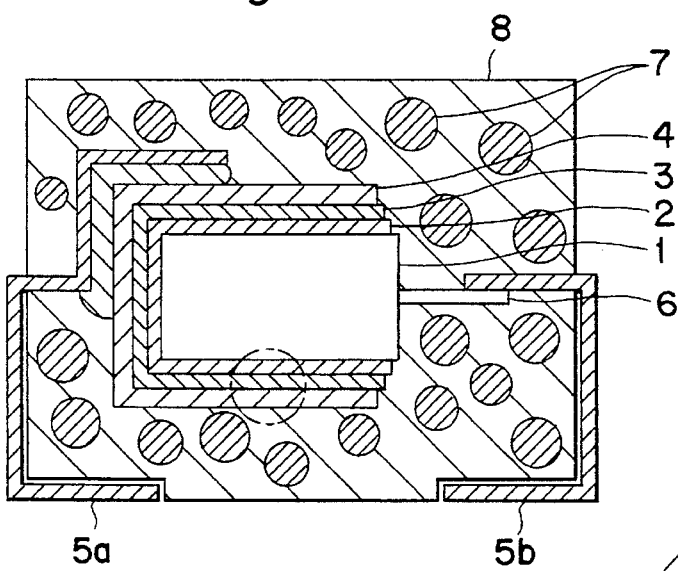
FIG. 7 shows still other example of the solid electrolytic capacitor of the present invention, wherein (a) is a sectional view and (b) is a partially enlarged view.
Figure 7B:
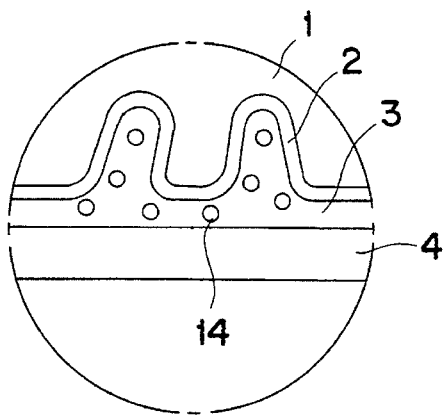

FIGS. 7(a) and 7(b) show other example of the solid electrolytic capacitor of the present invention.

A capacitor element was produced in the same manner as in Example 3. To the capacitor element were connected external electrodes 5a and 5b.

The outside of the thus-produced capacitor element was coated with an epoxy resin 8 containing an oxygen-adsorbing substance 7 selected from the group consisting of metal (e.g. Fe or Co) complexes including porphyrin, salcomine and their derivatives, to form a molded resin sheathing, whereby a solid electrolytic capacitor was completed.

This solid electrolytic capacitor had even higher high-temperature durability than the capacitor of Example 3.

TABLE 1

|  | Initial | | | 105° C. × 500 hrs | | | 105° C. × 1000 hrs | | |
| --- | --- | --- | --- | --- | --- | --- | --- | --- | --- |
|  | Electrostatic capacity (μF) | tan δ (%) | ESR (mΩ) | Electrostatic capacity (μF) | tan δ (%) | ESR (mΩ) | Electrostatic capacity (μF) | tan δ (%) | ESR (mΩ) |
| Comparative Example 1 | 15.0 | 1.0 | 80 | 14.5 | 3.1 | 103 | 12.5 | 8.1 | 103 |
| Comparative Example 2 | 15.0 | 1.1 | 85 | 14.4 | 3.2 | 105 | 12.0 | 8.3 | 108 |
| Example 1 | 15.0 | 1.9 | 78 | 14.9 | 2.1 | 83 | 14.4 | 2.8 | 87 |
| Example 2 | 15.0 | 1.9 | 79 | 14.9 | 2.1 | 85 | 14.5 | 2.9 | 87 |
| Example 3 | 15.0 | 1.9 | 79 | 14.9 | 2.0 | 82 | 14.4 | 3.2 | 86 |
| Example 4 | 15.0 | 1.9 | 79 | 14.9 | 2.0 | 81 | 14.3 | 2.9 | 88 |
| Example 5 | 15.0 | 1.9 | 79 | 14.9 | 1.9 | 80 | 14.9 | 2.1 | 82 |

What is claimed is:

1. A solid electrolytic capacitor comprising a metal having a dielectric oxide film formed thereon, a conductive polymer compound layer formed on said dielectric oxide film, a conductive paste layer formed on said conductive polymer compound layer, a molded resin sheathing having all of the above members buried therein, and a pair of electrodes connected to said metal and said conductive paste layer, respectively, in which capacitor an antioxidant is scattered, in the form of particles, in at least one of said conductive polymer compound layer, said conductive paste layer and the interface between the conductive polymer compound layer and the conductive paste layer.

2. A solid electrolytic capacitor comprising a metal having a dielectric oxide film formed thereon, a conductive polymer compound layer formed on said dielectric oxide film, a conductive paste layer formed on said conductive polymer compound layer, a molded resin sheathing having all of the above members buried therein, and a pair of electrodes connected to said metal and said conductive paste layer, respectively, in which capacitor an antioxidant is scattered, in the form of particles, on the outer surface of said conductive paste layer.

3. A solid electrolytic capacitor set forth in claim 1 or 2, wherein the antioxidant is at least one compound selected from the group consisting of phenol type compounds, benzophenone type compounds, salicylic acid type compounds and benzotriazole type compounds.

4. A process for producing a solid electrolytic capacitor comprising:

a step of forming, on a metal, a dielectric oxide film which is an oxide of said metal, a step of forming a conductive polymer compound layer on said dielectric oxide film, a step of forming a conductive paste player on said conductive polymer compound layer, a step of connecting a pair of external electrodes to said metal and said conductive paste layer, respectively and a step of scattering an antioxidant in the form of particles on said conductive paste layer.

5. A process for producing a solid electrolytic capacitor comprising:

a step of forming, on a metal, a dielectric oxide film which is an oxide of said metal, a step of forming a conductive polymer compound layer on said dielectric oxide film, a step of forming a conductive paste layer on said conductive polymer compound layer, and a step of scattering an antioxidant in the form of particles in at least one of said conductive polymer compound layer, said conductive paste layer and the interface between the conductive polymer compound layer and the conductive paste layer.

6. A process for producing a solid electrolytic capacitor according to claims 4 or 5, wherein the antioxidant is at least one compound selected from the group consisting of phenol type compounds, benzophenone type compounds, salicylic acid type compounds and benzotriazole type compounds.

7. A process for producing a solid electrolytic capacitor according to claims 4 or 5, wherein the antioxidant is a mixture of at least two different compounds selected from the group consisting of phenol type compounds, benzophenone type compounds, salicylic acid type compounds and benzotriazole type compounds.

* * * * *